April 23, 1940.                 D. A. BRODIE                  2,197,885
        MEANS AND METHOD FOR CONDITIONING MANURE AND CONTROLLING INSECT PESTS
                              Filed March 27, 1936
Fig. 1
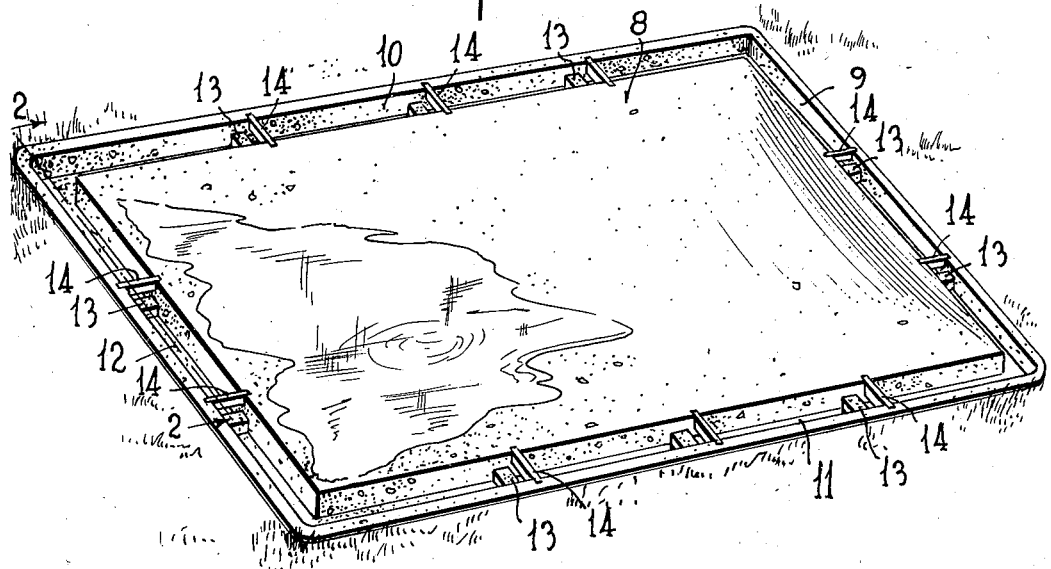
Fig. 2
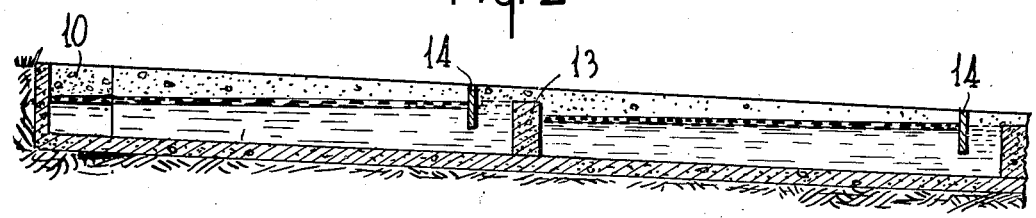
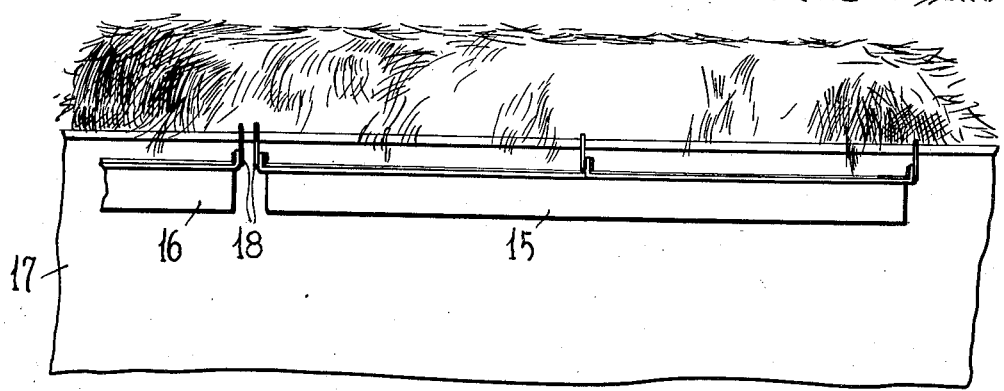
Fig. 3
Inventor
David A. Brodie
By Elmer Stewart
        Attorney Patented Apr. 23, 1940

2,197,885

UNITED STATES PATENT OFFICE 2,197,885

MEANS AND METHOD FOR CONDITIONING MANURE AND CONTROLLING INSECT PESTS

David A. Brodie, Washington, D. C.

Application March 27, 1936, Serial No. 71,289

8 Claims. (Cl. 43—107)

The following description relates to method and means for conditioning manure and controlling insect pests. In the handling of stable manure great difficulty is experienced in controlling flies and other insect pests which find in the manure an ideal environment for their life cycle. The primary purpose of my invention is to control the propagation of such pests during the handling of the manure and incidental to its conditioning.

A proper understanding of this problem and of the invention requires a brief consideration of the life cycle of insects such as the domestic fly. The fly lays its eggs in farm manure or other suitable material where its natural food is abundant. A large number of the fly eggs are deposited in batches. From these the larvae are hatched in large numbers and are to be found in each day's accumulation of manure. The development of the larvae from the egg is of course benefited by the heat naturally developing during the fermentation of the manure pile.

However, it has been observed that the larvae, when fully grown, leaves the manure pile or other feeding source and pupate in the soil immediately adjacent, seldom traveling more than ten or twenty feet before finding a suitable place in which to bury themselves.

It is in the soil around the pile that complete metamorphosis of the fly occurs. Naturally the fly breaking out of the pupa case is a fully developed insect which ultimately returns to the manure pile and starts the life cycle over again.

The nuisance is of course hard to control when we attempt to check the insects which have left the ground. It has been proposed to control the flies by disinfecting the manure pile and preventing the laying of the eggs but this is open to objections and limitations. The vulnerable stage at which the fly is most readily attacked, is when it is in the form of larvae.

My invention is in the control of the larvae as they migrate from the manure pile. I have found that at this stage they may readily be trapped in shallow troughs or trenches surrounding the pile and carrying some larvicidal solution such as oil. As the larvae will attempt to climb out of the solution and trench it is desirable to have vertical walls for the latter at least four inches in height above the liquid level. Experience has shown that such a height will prevent the escape of the larvae.

The larvae accumulating in the larvicidal solution or oil alters the bulk of the latter and changes its level. To maintain this level substantially constant, I have found it desirable on occasions to maintain the solution upon a body of water which may train off and compensate for the changes due to accumulation of the larvae. Also such an arrangement maintains the level and the effectiveness of the solution in spite of rainfall or the like.

From time to time the larvae may be skimmed from the surface of the solution and the latter restored to its full efficiency.

To carry out the purposes of this invention I have found that it is possible to surround any repository of manure with either permanent or temporary troughs containing the solution. The invention is, therefore, adapted for use upon a previously prepared platform or base of concrete or the like through which the larvae cannot penetrate and which will retain the liquid content of the manure. The invention can also be used on a wagon, railway car or the like and thus prevent the larvae from escaping the manure, garbage or other refuse material in transit.

I have illustrated the invention above described in the attached drawing in which—

Fig. 1 is a perspective view of a structure embodying one form of my invention;

Fig. 2 is a vertical section on the line 2—2 of Fig. 1 and

Fig. 3 is a side elevation of an alternative form of the invention applied to a railway hopper car.

In Figs. 1 and 2, I have shown a concrete base or foundation slightly concave from side to side and providing a shallow trough-like area with its greatest depth in the center.

This serves the purpose of draining the liquid content from the manure but at the same time conserving this liquid for resorption by the manure after the latter has been conditioned by fermentation. Construction of this base will of course satisfactorily prevent the larvae from reaching a resting place by digging and will force them to travel outwardly from the base of the pile.

This base or platform 8 may be of any suitable dimensions. It has been found convenient to make it of a standard width upon which wagons or trucks may be driven for unloading. After the pile has reached full height at one end the succeeding loads may be delivered at a farther point and thus the pile extended for an indefinite length to suit the requirements of the problem.

Across the upper end of the base there is constructed a permanent trough 9 of concrete or like material. This trough is proportioned of any suitable width but should be of sufficient depth to permit a four inch minimum wall above a two inch depth of larvicidal solution and this in turn above a body of water of any convenient depth. The important dimensions are to provide a minimum of four inches to prevent the larvae from climbing out and also to provide for a two inch depth of larvicidal solution.

The trough 9 connects at each end to side troughs 10 and 11 which extend for the full length of the base 8. The opposite or lower end of the base 8 has a transverse trough 12 connecting the ends of the longitudinal troughs 10 and 11. In the ordinary type of construction it is neither desirable nor necessary to provide for equal levels of the several troughs. In fact, it is desirable to provide for natural drainage to one point. As shown in Fig. 1 the slope is from the far point of trough 9 to the diagonally opposite junction between troughs 11 and 12.

In view of the slope of these troughs it would be difficult to maintain a uniform level for the solution throughout the several troughs. For this reason the troughs have been terraced by a series of shallow dams 13. These dams are shown in Fig. 2 to be of sufficient height to maintain the level of the solution at the desired point.

While it may be desirable to provide different levels some means must also be arranged to insure against the run-off or flow being from the surface of the liquid and thus carry off the active larvicidal solution. To accomplish this result I have made use of a series of baffles 14 which may either be permanent or preferably removable in the side walls of the troughs 9, 10, 11 and 12. These baffles serve to retain the larvicidal solution and its accumulation of larvae while permitting any drainage to take place by the transfer of the underlying water. The operation will be evident from Fig. 2.

In Fig. 3, I have shown a series of trough sections 15, 16 hung from the upper side edge of a railway, dump or gondola car 17. These trough sections are hung by means of any suitable hooks 18. The larvae creeping over the edge of the car will fall within one of the trough sections which contain the larvicidal solution. By constructing the troughs in sections 15 and 16 the car may be moved and even tilted over an incline without material disturbance of the larvicidal solution or its loss. In this way, the escape of the larvae and infestation of the ground traveled over, is prevented.

The action of the above described means will be clearly evident. A pile of manure built up on the base shown in Fig. 1 or within the car 17.

The fermentation or conditioning step is followed by a resorption of the liquid manure within the pile as above indicated.

Instinctively the larvae creep out of the pile and fall into the troughs 9, 10, 11, 12 or 15 and 16 as the case may be.

The larvicidal solutions in these troughs will promptly kill the larvae. The latter may attempt to escape but a vertical wall of four inches will prevent that. Periodically the larvae may be removed from the solution and the latter replaced if necessary. As shown in Figs. 1 and 2 a permanent equipment of this type is made so that it will permit the drainage of rain water from beneath the solution without loss of the latter.

While the above description applies to the method invented and the preferred means to carry it out, nevertheless, many changes may be made in minor details, proportions and materials without departing from the scope of the invention as defined in the following claims.

What I claim is:

1. Means for controlling insect pests in manure piles, comprising an impenetrable base directly supporting the material in which the insects incubate, said base having an upper surface of such area and of such shape that any liquid released by the manure will be retained on the surface, means providing a channel substantially surrounding the base and below the edges thereof and means for maintaining a body of liquid in all parts of said channel regardless of variations in the channel level.

2. Means for controlling insect pests in manure piles comprising an impenetrable base directly supporting the material in which the insects incubate, said base having an upper surface of such area and of such shape that any liquid released by the manure will be retained on the surface, a series of contiguous troughs substantially surrounding said base and below the edges thereof, and a body of larvicidal solution in said troughs regardless of variations in trough level and substantially surrounding the base.

3. Means for controlling insect pests in manure piles comprising an impenetrable base directly supporting the material in which the insects incubate, said base having an upper surface of such area and of such shape that any liquid released by the manure will be retained on the surface, a series of contiguous troughs of moderate slope substantially surrounding said base and below the edges thereof and means maintaining a larvicidal solution over the entire bottoms of the troughs regardless of their slope.

4. Means for controlling insect pests in manure piles comprising a rigid base or platform directly supporting the material in which the insects incubate, said base having an upper surface of such area and of such shape that any liquid released by the manure will be retained on the surface, a moderately sloping trough completely surrounding said base and a series of dams maintaining a larvicidal solution over the entire bottom of the trough.

5. Means for controlling insect pests in manure piles comprising a rigid base directly supporting the material in which the insects incubate, said base having an upper surface of such area and of such shape that any liquid released by the manure will be retained on the surface, a trough of moderate slope completedly surrounding said base, and below the edges thereof, a series of dams maintaining a larvicidal solution over the entire bottom of the trough, and a series of barriers associated with the dams to retard surface flow of the larvicidal solution.

6. Means for conditioning manure in piles and controlling insect pests comprising a shallow base adapted to support the manure without loss of its liquid content, said base having an upper surface of such area and of such shape that any liquid released by the manure will be retained on the surface, a series of moderately sloping trough sections completely surrounding said base, and below the edges thereof, and means for maintaining a larvicidal solution over the entire bottom of the trough sections.

7. The method of conditioning manure and controlling insect pests which consists in piling the manure in a heap on a rigid base repellant to larvae and retentive to the entire liquid content of the manure, and catching the larvae in a larvicidal solution held in a trough completely surrounding the base.

8. The method of conditioning manure and controlling insect pests which consists in piling the manure in a heap on a shallow rigid base repellant to both larvae and retentive to the entire liquid content of the manure, allowing the manure to condition by fermentation, catching the larvae in a larvicidal solution held in a trough completely surrounding the base and resorbing the liquid content in the conditioned manure.

D. A. BRODIE.